(12) United States Patent
LeBlanc et al.

(10) Patent No.: US 10,611,454 B2
(45) Date of Patent: Apr. 7, 2020

(54) AIRCRAFT CABIN PANEL AND METHOD OF MANUFACTURING THE SAME

(71) Applicant: The Boeing Company, Chicago, IL (US)

(72) Inventors: Russ Raynal LeBlanc, Kirkland, WA (US); Chris Gren McInelly, Stanwood, WA (US); Andrew Anthony Pillar, Camano Island, WA (US)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 15/450,956

(22) Filed: Mar. 6, 2017

(65) Prior Publication Data

US 2018/0251205 A1 Sep. 6, 2018

(51) Int. Cl.
*B64C 1/06* (2006.01)
*B32B 3/12* (2006.01)
*B32B 3/26* (2006.01)
*B32B 3/30* (2006.01)
*B32B 7/12* (2006.01)
*B32B 3/04* (2006.01)
*B32B 5/02* (2006.01)
(Continued)

(52) U.S. Cl.
CPC ............... *B64C 1/066* (2013.01); *B32B 3/04* (2013.01); *B32B 3/12* (2013.01); *B32B 3/263* (2013.01); *B32B 3/30* (2013.01); *B32B 5/02* (2013.01); *B32B 5/26* (2013.01); *B32B 7/12* (2013.01); *B32B 27/10* (2013.01); *B32B 27/12* (2013.01); *B32B 29/02* (2013.01); *B32B 29/06* (2013.01); *B32B 37/02* (2013.01); *B32B 37/12* (2013.01); *B33Y 10/00* (2014.12); *B33Y 40/00* (2014.12); *B33Y 80/00* (2014.12); *B32B 2250/24* (2013.01); *B32B 2255/02* (2013.01); *B32B 2255/10* (2013.01); *B32B 2255/12* (2013.01); *B32B 2260/023* (2013.01); *B32B 2260/028* (2013.01); *B32B 2260/046* (2013.01); *B32B 2262/0269* (2013.01); *B32B 2262/101* (2013.01); *B32B 2262/106* (2013.01); *B32B 2305/024* (2013.01); *B32B 2305/076* (2013.01); *B32B 2305/08* (2013.01); *B32B 2313/04* (2013.01); *B32B 2315/085* (2013.01); *B32B 2377/00* (2013.01); *B32B 2386/00* (2013.01); *B32B 2605/18* (2013.01)

(58) Field of Classification Search
None
See application file for complete search history.

(56) References Cited

U.S. PATENT DOCUMENTS

4,799,631 A * 1/1989 Humphries ............. B64C 1/066
105/337
8,784,592 B2 7/2014 Kolax et al.
(Continued)

*Primary Examiner* — Monica A Huson
(74) *Attorney, Agent, or Firm* — Armstrong Teasdale LLP (57) ABSTRACT

An interior panel for use in an aircraft cabin includes an inner core including a first surface and an opposing second surface. The interior panel also includes a first honeycomb layer coupled to the first surface and a second honeycomb layer coupled to the second surface. The inner core includes an integral forming tool configured to shape the first honeycomb layer and the second honeycomb layer. The interior panel also includes a first skin layer coupled to the first honeycomb layer and a second skin layer coupled to the second honeycomb layer.

15 Claims, 6 Drawing Sheets

(51) Int. Cl.
*B32B 5/26* (2006.01)
*B32B 27/12* (2006.01)
*B32B 27/10* (2006.01)
*B32B 29/06* (2006.01)
*B32B 29/02* (2006.01)
*B32B 37/02* (2006.01)
*B32B 37/12* (2006.01)
*B33Y 10/00* (2015.01)
*B33Y 40/00* (2020.01)
*B33Y 80/00* (2015.01)

(56) References Cited

U.S. PATENT DOCUMENTS

| | | |
|---|---|---|
| 8,944,374 B2 | 2/2015 | Schneider |
| 2011/0284689 A1 | 11/2011 | Thomas et al. |
| 2012/0141726 A1 | 6/2012 | Keller et al. |
| 2012/0177877 A1 | 7/2012 | Lebail et al. |

* cited by examiner

AIRCRAFT CABIN PANEL AND METHOD OF MANUFACTURING THE SAME

BACKGROUND

The field of the disclosure relates generally to aircraft cabin panels, and more specifically, to aircraft cabin panels that include an additively manufactured inner core.

At least some known aircraft cabins include interior panels that include a phenolic honeycomb core positioned between two exterior layers of a thermoset skin and may include a contoured shape and/or conic features. Such interior panels are conventionally formed in two different ways. The first formation method includes positioning the honeycomb and skin layers between opposing halves of steel dye tooling that are machined to form a negative mold of the cabin panel in its desired shape. The steel dyes are pressured together to form the honeycomb and skin layers into the desired shape as heat is applied until the honeycomb and skin layers are cured. The forming tooling is expensive to machine and a new set of dyes is required each time the design of the aircraft panel changes.

Another method of forming the aircraft panels includes laying up layers of skin by hand into a mold, placing the honeycomb layer on top, and then laying up additional layers of skin material. The honeycomb and skin is then placed in a vacuum bag where a vacuum is applied to force air out of the panel. While still in the vacuum bag, the panel is placed in an oven to bake for a predetermined amount of time under pressure and heat. This manufacturing method is time consuming and may result in high labor costs.

Furthermore, at least some known manufacturing methods require post-manufacture machining to cut the aircraft panel into its final desired shape using a costly and time consuming routing tool. The routing tool may also machine various insert provisions into the panel for attaching the panel to adjacent panels or to other structure of the aircraft. Additionally, at least some known aircraft panels include a border around the honeycomb and skin layers to cover the seams and to give the panel a finished appearance. However, the manufacture of at least some known borders is labor intensive and may shorten the service lifetime of the panel.

BRIEF DESCRIPTION

In one aspect, an inner core for use with an aircraft cabin interior panel is provided. The inner core includes a body portion and a border portion extending about a perimeter of the body portion. The border portion and the body portion are integrally formed from a thermoplastic material by additive manufacturing.

In another aspect, an interior panel for use in an aircraft cabin is provided. The interior panel includes an inner core including a first surface and an opposing second surface. The interior panel also includes a first honeycomb layer coupled to the first surface and a second honeycomb layer coupled to the second surface. The inner core includes an integral forming tool configured to shape the first honeycomb layer and the second honeycomb layer. The interior panel also includes a first skin layer coupled to the first honeycomb layer and a second skin layer coupled to the second honeycomb layer.

In yet another aspect, a method of manufacturing an aircraft cabin panel is provided. The method includes forming an inner core into a desired shape having a first side and an opposing second side. The method also includes coupling a first honeycomb layer to the first side and coupling a second honeycomb layer to the second side. A first skin layer is coupled to the first honeycomb layer, and a second skin layer is coupled to the second honeycomb layer. The method also includes processing the inner core, the first and second honeycomb layers, and the first and second skin layers to form the panel into the desired shape.

The features, functions, and advantages that have been discussed can be achieved independently in various embodiments or may be combined in yet other embodiments, further details of which can be seen with reference to the following description and drawings.

DETAILED DESCRIPTION

The examples described herein include forming an aircraft cabin panel without the need for time consuming and expensive tooling. The aircraft cabin panel includes an additively manufactured inner core, honeycomb layers coupled to opposing surfaces of the inner core, and exterior skin layers coupled to the honeycomb layers. The inner core is additively manufactured into the desired shape of the aircraft cabin panel and the rigid inner core allows the materials of the honeycomb and skin layers to conform to the final shape and size during the consolidation process. As such, the aircraft cabin panel takes its final form from the inner core without the use of shaping dyes or routing devices for post-machining. Furthermore, the integrally formed border portion and pluralities of inert provisions in the inner core preclude the need for the conventional steps of applying the border around the panel edges and routing the insert provisions into the panel after formation.

Figure 1:
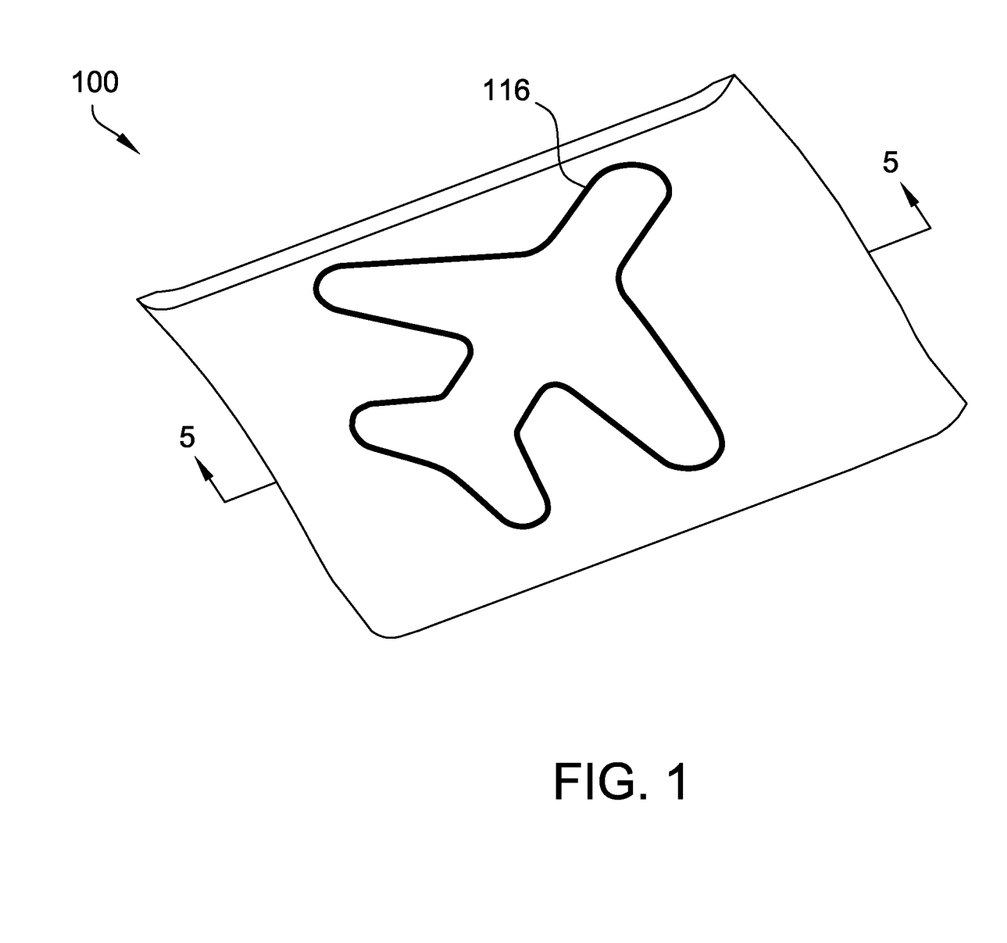
FIG. 1 is a perspective view of an exemplary aircraft cabin panel.
Figure 2:
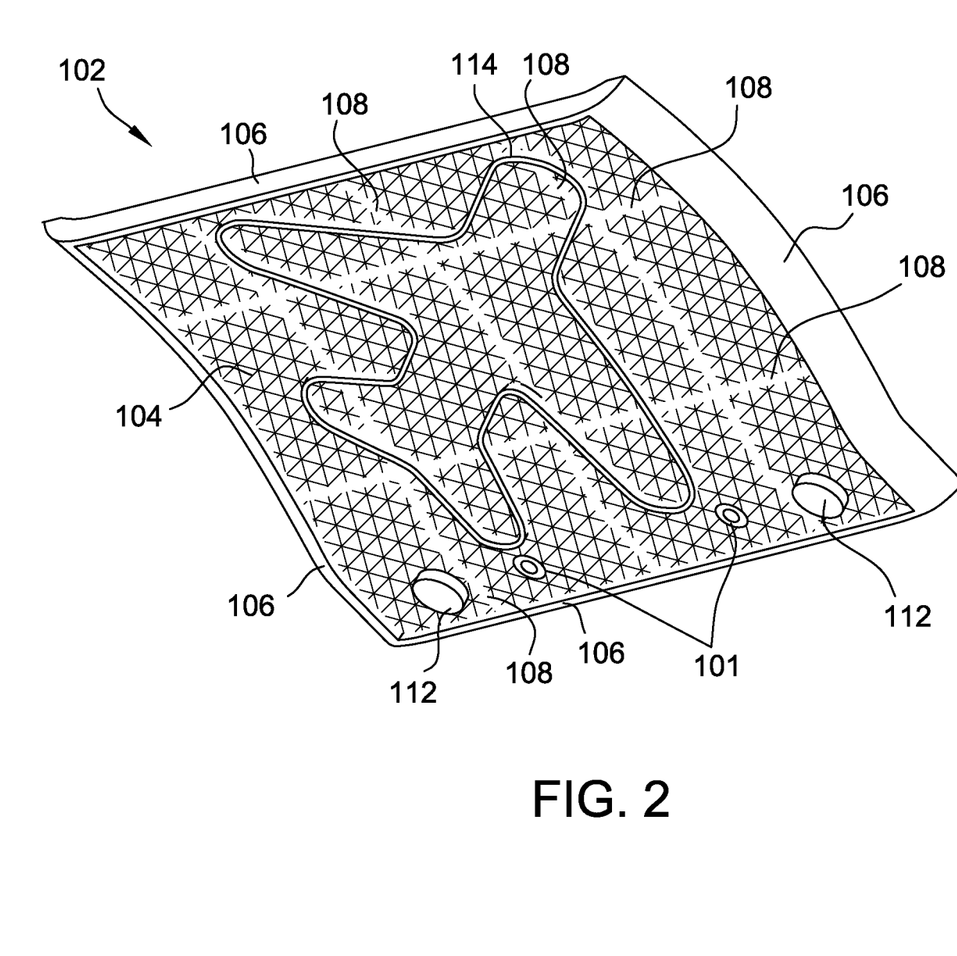
FIG. 2 is a perspective bottom view of an exemplary embodiment of an inner core that may be used with the aircraft cabin panel shown in FIG. 1.
Figure 3:
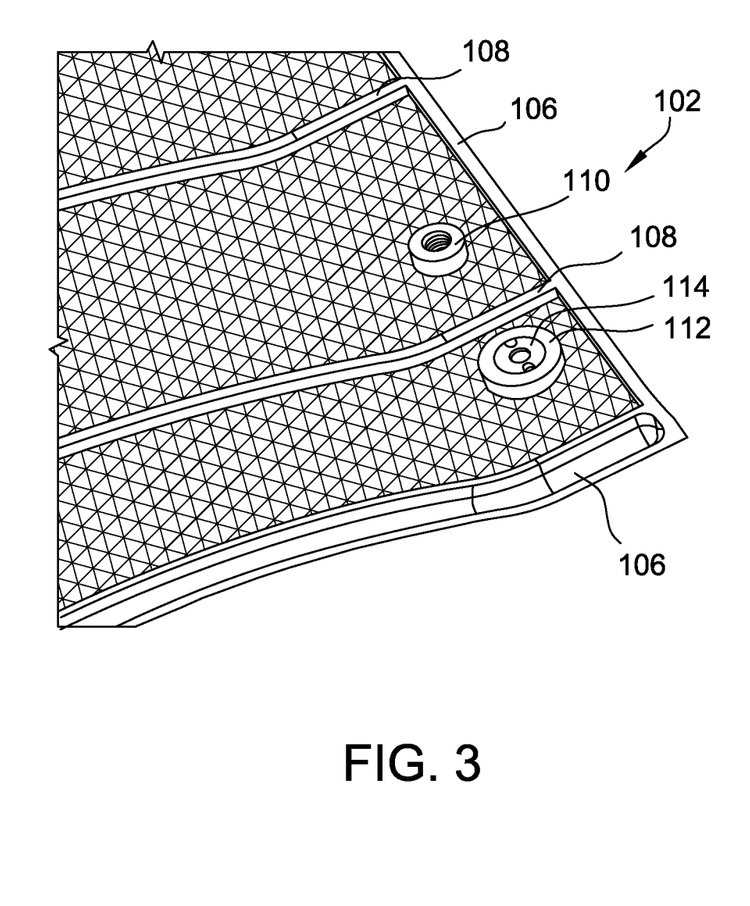
FIG. 3 is a perspective top view of a portion of the inner core shown in FIG. 2.

FIG. 1 is a perspective view of an aircraft cabin panel 100, FIG. 2 is a perspective bottom view of an inner core 102 that may be used with aircraft cabin panel 100 (shown in FIG. 1), and FIG. 3 is a perspective top view of a portion of inner core 102. In the exemplary implementation, inner core 102 includes a body portion 104 and a border portion 106 that extends about a perimeter of body portion 104. As described in further detail herein, body portion 104 and border portion 106 are integrally formed together using an additive manufacturing process. Additive manufacturing enables manufacture of body portion 104 into the final desired shaped without having to use large and expensive tooling to form aircraft cabin panel 100 into a desired shape. Specifically, in the exemplary implementation, body portion 104 and border portion 106 are integrally formed from a thermoplastic material, such as, but not limited to polyetherimide. In other implementations, body portion 104 and border portion 106 are integrally formed from any of polycarbonate, acrylonitrile-butadiene-stryene (ABS), polyamide, polysulfone, polyetheretherketone (PEEK), polyethersulfone (PES), polyetherketoneketone (PEKK), and any combination thereof, as well as reinforced variants of these materials that include at least one of glass fiber or carbon fiber. Generally, inner core 102 is formed from any material that facilitates operation of aircraft cabin panel as described herein.

As shown in FIG. 2, body portion 104 also includes at least one rib 108 integrally formed with body portion 104. More specifically, body portion 104 includes a plurality of ribs 108 that define a grid pattern in body portion 104. Ribs 108 provide additional strength to body portion 104 and to aircraft cabin panel 100 overall. Additionally, ribs 108 provide a structural load path through inner core 102 that transfers loads to a desired location.

In the exemplary implementation, as shown in FIGS. 2 and 3, body portion 104 further includes a plurality of first insert provisions 110 and a plurality of second insert provisions 112 integrally formed in body portion 104. Although two different insert provisions 110 and 112 are shown, body portion 104 may include any number of insert provisions as desired. As used herein, the term "insert provisions" is meant to include any feature that enables inner core 102 and aircraft cabin panel 100 to be coupled to another adjacent aircraft cabin panel 100 and/or to other structure within the aircraft cabin. More specifically, insert provisions 110 and 112 include bores or countersinks that receive an insert or a fastener 114 (shown in FIG. 3). Additionally, insert provisions 110 and 112 include bosses or clips that engage corresponding structure of an adjacent aircraft cabin panel 100 and/or to other aircraft structure. Generally, insert provisions 110 and 112 include any feature that enables attachment of inner core 102. In the exemplary implementation, insert provisions 110 and 112 are integrally formed in body portion 104 at the time of inner core 102 manufacture using additive manufacturing. Such integral formation negates the need to post-machine the insert provisions into inner core 102 and allows for the use of additional provisions not able to be post-machined into inner core 102.

FIG. 2 also illustrates a custom symbol 116 integrally formed in body portion 104. As described herein, additively manufacturing inner core 102 enables body portion 104 to include custom features without requiring post-machining after inner core 102 is formed. Symbol 116 includes any symbol or graphic, such as, but not limited to, a logo, a brand name, or any other insignia. As described below, symbol 116 is formed on body portion 104 and protrudes the other layers of aircraft cabin panel 100 so as to be seen by a passenger within the aircraft cabin.

Figure 4:
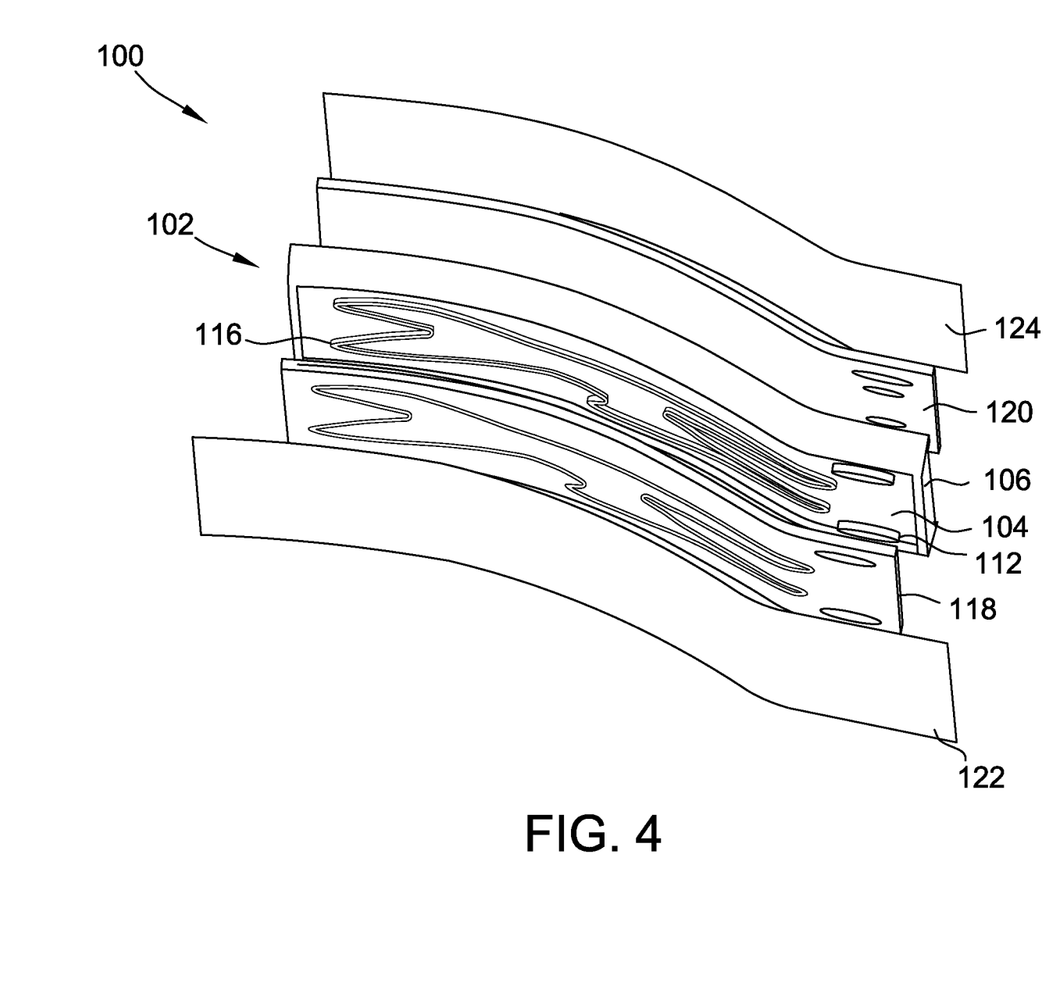
FIG. 4 is an exploded view of the aircraft cabin panel shown in FIG. 1 illustrating a plurality of layers.
Figure 5:
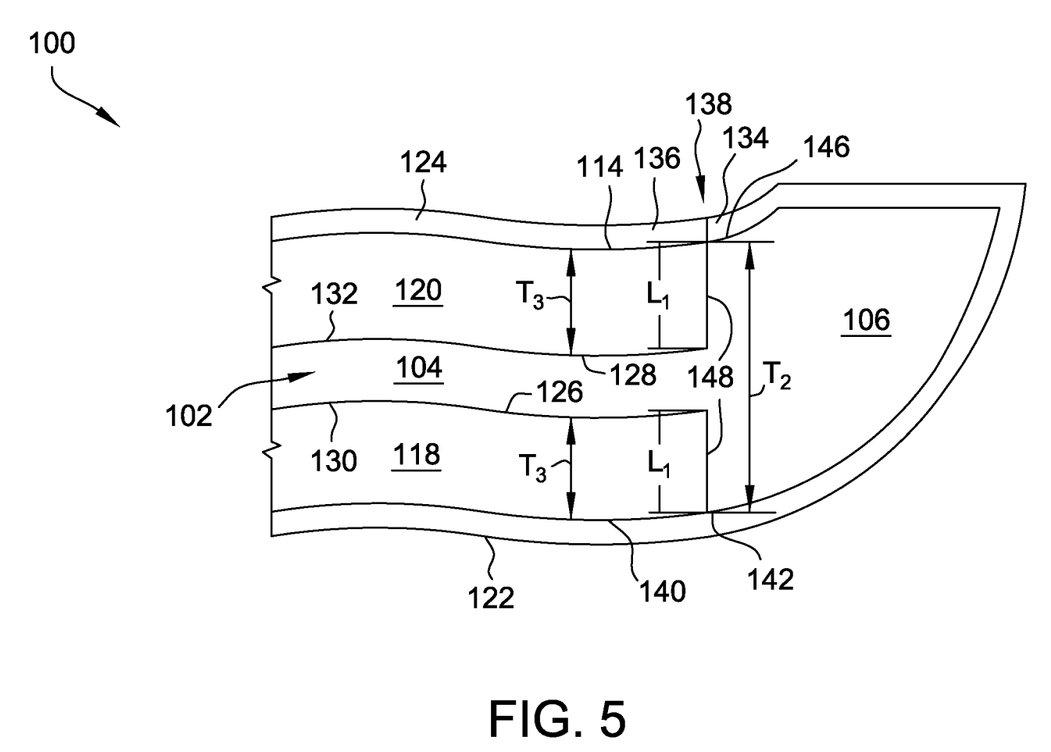
FIG. 5 is a cross-sectional view of the aircraft cabin panel along line 5-5 in FIG. 1 illustrating the plurality of layers shown in FIG. 4.

FIG. 4 is an exploded view of aircraft cabin panel 100 illustrating a plurality of layers, and FIG. 5 is a cross-sectional view of aircraft cabin panel 100 taken along line 5-5 in FIG. 1 illustrating the plurality of layers shown in FIG. 4. In the exemplary embodiment, aircraft cabin panel 100 includes inner core 102 including body portion 104 and border portion 106, a first honeycomb layer 118, a second honeycomb layer 120, a first skin layer 122, and a second skin layer 124. As shown, first honeycomb layer 118 is coupled to a first surface 126 of body portion 104 of inner core 102, and second honeycomb layer 120 is coupled to a second surface 128 of body portion 104 of inner core 102. Similarly, first skin layer 122 is coupled to first honeycomb layer 118, and second skin layer 124 is coupled to second honeycomb layer 120. Optionally, aircraft cabin panel 100 also includes a first adhesive layer 130 (shown in FIG. 5) coupled between first surface 126 and first honeycomb layer 118 and a second adhesive layer 132 (shown in FIG. 5) coupled between second surface 128 and second honeycomb layer 120. Adhesive layers 130 and 132 facilitate attaching honeycomb layers 118 and 120 to surfaces 126 and 128 of body portion 104 of inner core 102.

In the exemplary implementation, border portion 106 extends about a perimeter of body portion 104 and about a perimeter of first honeycomb layer 118 and second honeycomb layer 120. Similarly, border portion 106 extends about a perimeter of second skin layer 124. First skin layer 122 is exposed to the interior of the aircraft cabin and so is in plain view of passengers within the cabin. As such, first skin layer 122 wraps around border 106 such that an end 134 of first skin layer 122 is adjacent an end 136 of second skin layer 124 to form a seam 138 therebetween. Seam 138 is located on a rear side of aircraft cabin panel 100 so as not to be viewable by a passenger within the cabin. Alternatively, first skin layer 122 wraps around border 106 such that an end 134 of first skin layer 122 overlaps an end 136 of second skin layer 124 to form an overlapped area. The overlap area is located on a rear side of aircraft cabin panel 100 so as not to be viewable by a passenger within the cabin As shown in FIG. 5, body portion 104 includes a first thickness T1, and border portion 106 includes a second thickness T2, which is greater than first thickness T1, where body portion 104 transitions to border portion 106. Furthermore, in one implementation, body portion 104 is positioned proximate a midpoint of second thickness T2, such that border portion 106 extends a substantially similar length L1 in opposing directions from surfaces 126 and 128 of body portion 104. Each honeycomb layer 118 and 120 includes a third thickness T3 that is substantially similar to length L1. As such, an outer surface 140 of first honeycomb layer 118 is substantially flush with a surface 142 of border portion 106 where body portion 104 transitions to border portion 106. Similarly, an outer surface 144 of second honeycomb layer 120 is substantially flush with a surface 146 of border portion 106 where body portion 104 transitions to border portion 106. In another implementation, first thickness T1 of body portion 104 is less than thickness T2 of border portion 106 and body portion 104 is positioned at any location along second thickness T2 such that honeycomb layers 118 and 120 defines thicknesses that are different from each other. Additionally, each honeycomb layer 118 and 120 includes a side edge 148 that is aligned with where body portion 104 transitions to border portion 106. Although border portion 106 is shown in FIG. 5 as a stylized shape, integrally forming border portion 106 with body portion 104 using additive manufacturing enables border portion 106 to have any desired shape and ensures a union between border portion 106 with body portion 104.

As described herein, inner core 102 is formed from a thermoplastic material. First and second honeycomb layers 118 and 120 are formed from a phenolic material, and first and second skin layers 122 and 124 are formed from a thermoset material. For example, first and second honeycomb layers 118 and 120 are formed from a fiberglass fabric or an aramid paper and stabilized by a heat resistant phenolic resin, and first and second skin layers 122 and 124 are formed from a thermoset material including glass or carbon fiber fabrics pre-impregnated with a rigid, thermosetting, fire-resistant, modified phenolic resin. Alternatively, first and second honeycomb layers 118 and 120 and first and second skin layers 122 and 124 are formed from any thermoset material that facilitates operation of panel 100 as described herein.

As shown in FIG. 4, first honeycomb layer 118 also includes symbol 116 formed therein. More specifically, material is removed from honeycomb layer 118 in the shape of symbol 116 such that the raised material of symbol 116 on inner core 102 protrudes through honeycomb layer 118. As such, when skin layer 122 is applied to honeycomb layer 118 and aircraft cabin panel 100 is subjected to a vacuum as described in further detail below, symbol 116 is formed in skin layer 122, as shown in FIG. 1, and is therefore visible to a passenger within the aircraft cabin.

Figure 6:
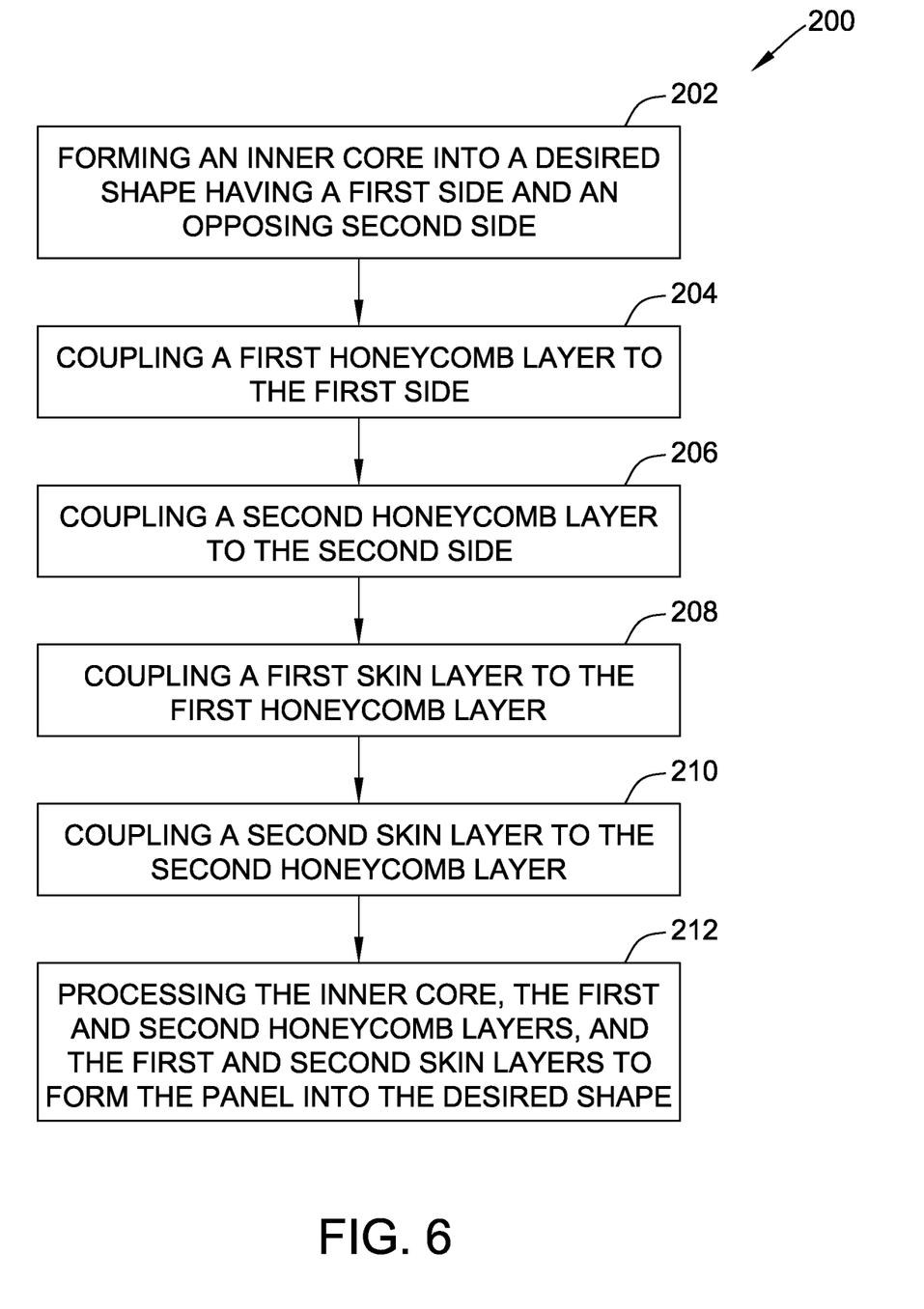
FIG. 6 is a flow diagram illustrating an exemplary method of manufacturing the aircraft cabin panel shown in FIGS. 1-5.

FIG. 6 is a flow diagram illustrating an exemplary method 200 of manufacturing aircraft cabin panel 100 (shown in FIGS. 1-5). Method 200 includes forming 202 an inner core, such as inner core 102, into a desired shape having a first side, such as first side 126, and an opposing second side, such as second side 128. Forming 202 includes forming the inner core from a thermoplastic material. Forming 202 the inner core also includes forming a body portion, such as body portion 104, and integrally forming a border portion, such as border portion 106, with the body portion using additive manufacturing such that the border portion extends about the perimeter of the body portion. Additionally, forming 202 the body portion includes integrally forming a plurality of ribs, such as ribs 108, into the body portion of the inner core and integrally forming a plurality of insert provisions, such as insert provisions 110 and 112, into the body portion of the inner core.

In the exemplary embodiment, method 200 also includes coupling 204 a first honeycomb layer, such as honeycomb layer 118, to the first side of the inner core and coupling 206 a second honeycomb layer, such as honeycomb layer 120, to the second side of the inner core. More specifically, coupling 204 and 206 includes coupling the first and second honeycomb layers to the body portion of the inner core. Furthermore, forming 202 the border portion includes forming the border portion about a perimeter of the first and second honeycomb layers. Method 200 also includes coupling 208 a first skin layer, such as skin layer 122, to the first honeycomb layer and coupling 210 a second skin layer, such as skin layer 124, to the second honeycomb layer. More specifically, coupling 208 includes coupling the first skin layer to the first honeycomb layer and to the border portion such that the first skin layer extends across the first honeycomb layer and around the border portion. Finally, method 200 includes processing 212 the inner core, the first and second honeycomb layers, and the first and second skin layers to form the panel into the desired shape. More specifically, processing 212 includes inserting the assembled panel into a vacuum bag and applying heat and a vacuum to the panel to mold the honeycomb layers and skin layers around the inner core and into the final desired shape of the panel. Because the inner core is additively manufactured into the desired shape of the panel, and because the honeycomb layers and skin layers can be molded around the inner core into the desired shape, the processing step 212 does not include forming any of the inner core, the first and second honeycomb layers, and the first and second skin layers with shaping tooling into the desired shape of the panel. As such, the expensive steel shaping dyes are not required when the inner core is additively manufactured.

The examples described herein include forming an aircraft cabin panel without the need for time consuming and expensive tooling. The aircraft cabin panel includes an additively manufactured inner core, honeycomb layers coupled to opposing surfaces of the inner core, and exterior skin layers coupled to the honeycomb layers. The inner core is additively manufactured into the desired shape of the aircraft cabin panel and the rigid inner core allows the materials of the honeycomb and skin layers to conform to the final shape and size during the consolidation process. As such, the aircraft cabin panel takes its final form from the inner core without the use of shaping dyes or routing devices for post-machining. Furthermore, the integrally formed border portion and pluralities of inert provisions in the inner core preclude the need for the conventional steps of applying the border around the panel edges and routing the insert provisions into the panel after formation.

Furthermore, in operation, the aircraft cabin panel and method of manufacture includes at least one of the following technical effects: 1) reduction in manufacturing time due to the elimination of multiple steps required by the conventional method; 2) reduction in manufacturing costs due to the elimination of equipment required by the conventional method; and 3) the ability to customize the shape of the panel to include both functional and design features using additive manufacturing.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of manufacturing an aircraft cabin panel, said method comprising:
    forming an inner core into a desired shape having a first side and an opposing second side, wherein forming the inner core comprises forming the inner core from a thermoplastic material;
    coupling a first honeycomb layer to the first side;
    coupling a second honeycomb layer to the second side;
    coupling a first skin layer to the first honeycomb layer;
    coupling a second skin layer to the second honeycomb layer; and
    processing the inner core, the first and second honeycomb layers, and the first and second skin layers to form the panel into the desired shape.

2. The method in accordance with claim 1, wherein forming the inner core comprises:
    forming a body portion; and
    integrally forming a border portion extending about a perimeter of the body portion, wherein the body portion and the border portion are integrally formed using additive manufacturing.

3. The method in accordance with claim 2, wherein coupling the first honeycomb layer to the first side comprises coupling the first honeycomb layer to the body portion, and wherein forming the border portion comprises forming the border portion about the perimeter of the first and second honeycomb layers.

4. The method in accordance with claim 2, wherein coupling the first skin layer comprises coupling the first skin layer to the first honeycomb layer and to the border portion such that the first skin layer extends across the first honeycomb layer and around the border portion.

5. The method according to claim 1, wherein forming the inner core comprises:
   integrally forming a plurality of ribs into the inner core; and
   integrally forming a plurality of insert provisions into the inner core.

6. A method of manufacturing an aircraft cabin panel, said method comprising:
   forming an inner core into a desired shape having a first side and an opposing second side, wherein forming the inner core comprises:
      forming a body portion; and
      integrally forming a border portion extending about a perimeter of the body portion, wherein the body portion and the border portion are integrally formed using additive manufacturing;
   coupling a first honeycomb layer to the first side;
   coupling a second honeycomb layer to the second side;
   coupling a first skin layer to the first honeycomb layer;
   coupling a second skin layer to the second honeycomb layer; and
   processing the inner core, the first and second honeycomb layers, and the first and second skin layers to form the panel into the desired shape.

7. A method of manufacturing an aircraft cabin panel, said method comprising:
   forming an inner core into a desired shape having a first side and an opposing second side, wherein forming the inner core comprises:
      integrally forming a plurality of ribs into the inner core; and
      integrally forming a plurality of insert provisions into the inner core;
   coupling a first honeycomb layer to the first side;
   coupling a second honeycomb layer to the second side;
   coupling a first skin layer to the first honeycomb layer;
   coupling a second skin layer to the second honeycomb layer; and
   processing the inner core, the first and second honeycomb layers, and the first and second skin layers to form the panel into the desired shape.

8. The method in accordance with claim 6, wherein coupling the first honeycomb layer to the first side comprises coupling the first honeycomb layer to the body portion, and wherein forming the border portion comprises forming the border portion about the perimeter of the first and second honeycomb layers.

9. The method in accordance with claim 6, wherein coupling the first skin layer comprises coupling the first skin layer to the first honeycomb layer and to the border portion such that the first skin layer extends across the first honeycomb layer and around the border portion.

10. The method according to claim 6, wherein forming the inner core comprises:
    integrally forming a plurality of ribs into the inner core; and
    integrally forming a plurality of insert provisions into the inner core.

11. The method according to claim 6, wherein forming the inner core comprises forming the inner core from a thermoplastic material.

12. The method in accordance with claim 7, wherein coupling the first honeycomb layer to the first side comprises coupling the first honeycomb layer to the body portion, and wherein forming the border portion comprises forming the border portion about the perimeter of the first and second honeycomb layers.

13. The method in accordance with claim 7, wherein coupling the first skin layer comprises coupling the first skin layer to the first honeycomb layer and to the border portion such that the first skin layer extends across the first honeycomb layer and around the border portion.

14. The method according to claim 7, wherein forming the inner core comprises:
    forming a body portion; and
    integrally forming a border portion extending about a perimeter of the body portion, wherein the body portion and the border portion are integrally formed using additive manufacturing.

15. The method according to claim 7, wherein forming the inner core comprises forming the inner core from a thermoplastic material.

* * * * *